United States Patent
Shavell et al.

(10) Patent No.: US 10,148,688 B1
(45) Date of Patent: *Dec. 4, 2018

(54) SYSTEMS AND METHODS FOR DETECTING ILLEGITIMATE DEVICES ON WIRELESS NETWORKS

(71) Applicant: Symantec Corporation, Mountain View, CA (US)

(72) Inventors: Michael Shavell, Merrimack, NH (US); Matt Boucher, Merrimack, NH (US); Christopher Robichaud, Belmont, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/616,763

(22) Filed: Feb. 9, 2015

(51) Int. Cl.
| | |
|---|---|
| *H04L 29/06* | (2006.01) |
| *H04W 12/02* | (2009.01) |
| *H04W 24/08* | (2009.01) |
| *H04W 8/00* | (2009.01) |
| *H04L 12/24* | (2006.01) |
| *H04L 12/751* | (2013.01) |

(52) U.S. Cl.
CPC .......... *H04L 63/1466* (2013.01); *H04L 41/12* (2013.01); *H04L 45/02* (2013.01); *H04W 8/005* (2013.01); *H04W 12/02* (2013.01); *H04W 24/08* (2013.01)

(58) Field of Classification Search
CPC . H04L 63/1466; H04L 63/10; H04L 63/1433; H04L 41/12; H04L 45/02; H04W 12/02; H04W 24/08; H04W 8/005
See application file for complete search history.

(56) References Cited

U.S. PATENT DOCUMENTS

| | | | |
|---|---|---|---|
| 8,191,143 B1 | 5/2012 | Lin et al. | |
| 8,606,219 B1 | 12/2013 | Barbee et al. | |
| 8,844,041 B1 | 9/2014 | Kienzle et al. | |
| 9,420,513 B1 * | 8/2016 | Yalagandula | ......... H04W 24/00 |
| 9,730,075 B1 | 8/2017 | Shavell et al. | |
| 2003/0219008 A1 | 11/2003 | Hrastar | |

(Continued)

OTHER PUBLICATIONS

Justin Harmon; Systems and Methods for Detecting Potentially Illegitimate Wireless Access Points; U.S. Appl. No. 14/608,218, filed Jan. 29, 2015.

(Continued)

*Primary Examiner* — Ayoub Alata
(74) *Attorney, Agent, or Firm* — FisherBroyles, LLP

(57) ABSTRACT

The disclosed computer-implemented method for detecting illegitimate devices on wireless networks may include (1) identifying an initial set of hops that represent devices on a wireless network that relay network traffic between the computing device and a destination, (2) identifying, after identifying the initial set of hops, a new set of hops that relay the network traffic between the computing device and the destination, (3) comparing the initial set of hops to the new set of hops, and (4) determining, based on the comparison, that the new set of hops comprises an abnormality that indicates an illegitimate device is intercepting the network traffic on the wireless network between the computing device and the destination. Various other methods, systems, and computer-readable media are also disclosed.

20 Claims, 7 Drawing Sheets

(56) References Cited

U.S. PATENT DOCUMENTS

| | | | |
|---|---|---|---|
| 2003/0233567 | A1 | 12/2003 | Lynn et al. |
| 2004/0117624 | A1 | 6/2004 | Brandt et al. |
| 2004/0236547 | A1 | 11/2004 | Rappaport et al. |
| 2006/0193284 | A1 | 8/2006 | Stieglitz et al. |
| 2006/0200862 | A1 | 9/2006 | Olson et al. |
| 2007/0079376 | A1 | 4/2007 | Robert et al. |
| 2007/0153763 | A1* | 7/2007 | Rampolla ............ H04L 41/0806 370/351 |
| 2007/0283042 | A1* | 12/2007 | West ....................... H04L 65/80 709/238 |
| 2010/0172259 | A1 | 7/2010 | Aggarwal et al. |
| 2010/0207732 | A1 | 8/2010 | Patwari et al. |
| 2012/0304297 | A1 | 11/2012 | Chung et al. |
| 2012/0309420 | A1 | 12/2012 | Morgan et al. |
| 2013/0182697 | A1 | 7/2013 | Tuominen et al. |
| 2013/0217358 | A1 | 8/2013 | Snider |
| 2013/0217411 | A1 | 8/2013 | Croy et al. |
| 2014/0201808 | A1 | 7/2014 | Yada |
| 2014/0304770 | A1 | 10/2014 | Jung |
| 2014/0378059 | A1 | 12/2014 | Ouchi |
| 2015/0024787 | A1 | 1/2015 | Ben-Itzhak et al. |
| 2016/0029217 | A1 | 1/2016 | Yoo |
| 2016/0149935 | A1 | 5/2016 | Liu et al. |
| 2016/0192136 | A1 | 6/2016 | Pan et al. |
| 2016/0316426 | A1 | 10/2016 | Kumar |

OTHER PUBLICATIONS

Michael Shavell, et al; Systems and Methods for Detecting Illegitimate Devices on Wireless Networks; U.S. Appl. No. 14/616,761, filed Feb. 9, 2015.
Justin Harmon; Systems and Methods for Detecting Potentially Illegitimate Wireless Access Points; U.S. Appl. No. 14/625,075, filed Feb. 18, 2015.
Lim, Kwontaek et al., "Scheme of Rogue AP detection in managed WLAN based on AP's location", http://xuebao.nuc.edu.cn/new/english.php?id=85&tid=646, as accessed Dec. 3, 2014, Journal of Measurement Science and Instrumentation, vol. 3 No. 4, Sum No. 12, (Dec. 2012).
Lim, Kwontaek et al., "Scheme of Rogue AP detection in managed WLAN based on AP's location", http://xuebao.nuc.edu.cn/new/uploads/File/jmsi2012-4-370.pdf, as accessed Dec. 3, 2014, Journal of Measurement Science and Instrumentation, vol. 3 No. 4, Sum No. 12, (Dec. 2012), pp. 370-373.
"WiFi Pineapple", https://www.wifipineapple.com/, as accessed Dec. 3, 2014, (Sep. 26, 2011).
"Smart WiFi Toggler", https://play.google.com/store/apps/details?id=com.sebouh00.smartwifitoggler&hl=en, as accessed Dec. 3, 2014, (Dec. 13, 2012).
"Coordinate Distance Calculator", http://boulter.com/gps/distance/?from=38.2500%B0+N%2C+85.7667%B0+W&to=38.0297%B0+N%2C+84.4947%B0+W&units=m, as accessed Dec. 3, 2014, (On or before Dec. 3, 2014).
"802.11 WLAN Packet Types", http://www.wildpackets.com/resources/compendium/wireless_lan/wlan_packet_types, as accessed Dec. 3, 2014, WildPackets, Inc., (Apr. 15, 2010).
"Wireless access point", http://en.wikipedia.org/wiki/Wireless_access_point, as accessed Dec. 3, 2014, Wikipedia, (Apr. 14, 2004).
"Stop connecting to a particular wifi network based on my location", http://android.stackexchange.com/questions/83925/stop-connecting-to-a-particular-wifi-network-based-on-my-location, as accessed Dec. 3, 2014, (Oct. 2, 2014).
"How to block apps on tablet from accessing the Internet while on tethering", http://android.stackexchange.com/questions/63987/how-to-block-apps-on-tablet-from-accessing-the-internet-while-on-tethering, as accessed Dec. 3, 2014, (Feb. 21, 2014).
Cipriani, Jason "Stop Android 4.3 from always scanning for Wi-Fi networks", http://www.cnet.com/how-to/stop-android-4-3-from-always-scanning-for-wi-fi-networks/, as accessed Dec. 3, 2014, (Aug. 2, 2013).

Boubina DR, "How to Disable Wifi Auto Connect on iPhone", https://snapguide.com/guides/disable-wifi-auto-connect-on-iphone/, as accessed Dec. 3, 2014, (Jul. 22, 2012).
"LG G3—WiFi Auto-On Issue", https://support.t-mobile.com/thread/75809, as accessed Dec. 3, 2014, (Aug. 7, 2014).
"Best Practices for Rogue Detection and Annihilation", http://airmagnet.flukenetworks.com/assets/whitepaper/Rogue_Detection_White_Paper.pdf, as accessed Dec. 3, 2014, A Technical Whitepaper, AirMagnet, Inc., (Nov. 2004).
"How do you prevent rogue wireless access points on a network?", http://networkengineering.stackexchange.com/questions/123/how-do-you-prevent-rogue-wireless-access-points-on-a-network, as accessed Dec. 3, 2014, (May 8, 2013).
K. N., Gopinath et al., "All You Wanted to Know About WiFi Rogue Access Points", http://www.rogueap.com/rogue-ap-docs/RogueAP-FAQ.pdf, as accessed Dec. 3, 2014, AirTight Networks, Inc., (2009).
"Rogue access point", http://en.wikipedia.org/wiki/Rogue_access_point, as accessed Dec. 3, 2014, Wikipedia, (Oct. 22, 2005).
"Rogue access points: Preventing, detecting and handling best practices", http://searchnetworking.techtarget.com/Rogue-access-points-Preventing-detecting-and-handling-best-practices, as accessed Dec. 3, 2014, TechTarget, (May 2009).
"Tracking down a rogue access point", http://security.stackexchange.com/questions/10783/tracking-down-a-rogue-access-point, as accessed Dec. 9, 2014, (Jan. 18, 2012).
"Traceroute", https://en.wikipedia.org/wiki/Traceroute, as accessed Dec. 9, 2014, Wikipedia, (Feb. 24, 2004).
Hunt, Troy "The beginners guide to breaking website security with nothing more than a Pineapple", http://www.troyhunt.com/2013/04/the-beginners-guide-to-breaking-website.html, as accessed Dec. 9, 2014, (Apr. 17, 2013).
Michael Shavell, et al.; Systems and Methods for Detecting Illegitimate Devices on Wireless Networks; U.S. Appl. No. 14/617,245, filed Feb. 9, 2015.
"Why don't wifi managers remember mac addresses for hotspots to defeat the jasager attack?", http://security.stackexchange.com/questions/14854/why-dont-wifi-managers-remember-mac-addresses-for-hotspots-to-defeat-the-jasage, as accessed Dec. 9, 2014, (May 10, 2012).
"7. MAC Frame Formats", http://grouper.ieee.org/groups/802/15/pub/2001/Jul01/01292r1P802-15_TG3-Proposed-Changes-to-Frame-Formats.pdf, as accessed Dec. 9, 2014, (2001).
"Frame check sequence", http://en.wikipedia.org/wiki/Frame_check_sequence, as accessed Dec. 9, 2014, Wikipedia, (Apr. 5, 2005).
"Service set (802.11 network)", http://en.wikipedia.org/wiki/Service_set_%28802.11_network%29, as accessed Dec. 9, 2014, Wikipedia, (Jul. 10, 2009).
"Part 11: Wireless LAN Medium Access Control (MAC) and Physical Layer (PHY) Specifications", http://standards.ieee.org/getieee802/download/802.11-2012.pdf, as accessed Dec. 9, 2014, IEEE Std 802.11™-2012 (Revision of IEEE Std 802.11-2007), IEEE Computer Society, New York, (Feb. 6, 2012).
Dai Zovi, Dino A., "Karma Attacks Radioed Machines Automatically", http://theta44.org/karma/, as accessed Dec. 9, 2014, (Jan. 17, 2006).
Girsas, Paul "Wifi Radar", https://play.google.com/store/apps/details?id=girsas.wifiradar&hl=en, as accessed Jan. 16, 2015, (Dec. 24, 2013).
"Chapter 6—Configuring Radio Setting", http://www.cisco.com/c/en/us/td/docs/wireless/access_point/12-4_10b_JA/configuration/guide/scg12410b/scg12410b-chap6-radio.html, as accessed Jan. 16, 2015, Cisco, (On or before Sep. 15, 2014).
"Chapter 9—Configuring an Access Point as a Local Authenticator", http://www.cisco.com/c/en/us/td/docs/wireless/access_point/12-4_10b_JA/configuration/guide/scg12410b/scg12410b-chap9-localauth.html, as accessed Jan. 16, 2015, Cisco, (On or before Sep. 6, 2014).
"WLA Series Wireless LAN Access Points", https://www.juniper.net/assets/us/en/local/pdf/datasheets/1000359-en.pdf, as accessed Jan. 16, 2015, Data Sheet, Juniper Networks, Inc., (Jun. 2013).
"Aruba 100 Series Access Points", http://www.arubanetworks.com/assets/ds/DS_AP100Series.pdf, as accessed Jan. 16, 2015, Data Sheet, Aruba Networks, Inc., (On or before Jan. 16, 2015).

(56) References Cited

OTHER PUBLICATIONS

Notenboom, Leo A., "How can I block neighboring wireless networks?", http://ask-leo.com/how_can_i_block_neighboring_wireless_networks.html, as accessed Jan. 16, 2015, (Jan. 30, 2007).

Roos, Dave "How Wireless Mesh Networks Work", http://computer.howstuffworks.com/how-wireless-mesh-networks-work.htm, as accessed Jan. 16, 2015, (Dec. 4, 2008).

Leslie, David "Rogue Wireless Access Point Detection and Remediation", http://www.giac.org/paper/gsec/4060/rogue-wireless-access-point-detection-remediation/106460, as accessed Jan. 16, 2015, Global Information Assurance Certification Paper, SANS Institute 2004, (Sep. 9, 2004).

Pacchiano, Ronald "How to Track Down Rogue Wireless Access Points", http://www.smallbusinesscomputing.com/webmaster/article.php/3590656/How-to-Track-Down-Rogue-Wireless-Access-Points.htm, as accessed Jan. 16, 2015, (Mar. 10, 2006).

"Rogue Detection under Unified Wireless Networks", http://www.cisco.com/c/en/us/support/docs/wireless-mobility/wireless-lan-wlan/70987-rogue-detect.html, as accessed Jan. 16, 2015, Document ID: 70987, Cisco, (On or before Sep. 25, 2007).

"Locating Rogue WiFi Access Points", https://www.virtuesecurity.com/blog/locating-rogue-wifi-access-points/, as accessed Jan. 16, 2015, Virtue Security, (Oct. 5, 2013).

"NetSurveyor—802.11 Network Discovery / WiFi Scanner", http://nutsaboutnets.com/netsurveyor-wifi-scanner/, as accessed Jan. 16, 2015, Nuts About Nets, (Nov. 16, 2011).

Michael Shavell, et al.; Systems and Methods for Detecting Network Security Deficiencies on Endpoint Devices; U.S. Appl. No. 15/199,149, filed Jun. 30, 2016.

Captive portal; https://en.wikipedia.org/wiki/Captive_portal, as accessed May 17, 2016; Wikipedia; (Jan. 25, 2005).

Ankit Kurani; Systems and Methods for Detecting Potentially Illegitimate Wireless Access Points; U.S. Appl. No. 14/732,811, filed Jun. 8, 2015.

"Domain Name System", http://en.wikipedia.org/wiki/Domain_Name_System, as accessed Apr. 6, 2015, Wikipedia, (Jan. 23, 2004).

Mitchell, Bradley "What is a DNS Server?", http://compnetworking.about.com/od/dns_domainnamesystem/f/dns_servers.htm, as accessed Apr. 6, 2015, (Feb. 19, 2007).

"What is the difference between public and private IP addresses?", http://supportcenter.verio.com/KB/questions.php?questionid=655, as accessed Apr. 6, 2015, Verio Inc., (On or before Apr. 6, 2015).

Michael Shavell, et al.; Systems and Methods for Preventing Computing Devices from Sending Wireless Probe Packets; U.S. Appl. No. 14/949,927, filed Nov. 24, 2015.

"802.11 WLAN Packet Types", http://www.wildpackets.com/resources/compendium/wireless_lan/wlan_packet_types, as accessed Oct. 14, 2015, (Apr. 15, 2010).

* cited by examiner

SYSTEMS AND METHODS FOR DETECTING ILLEGITIMATE DEVICES ON WIRELESS NETWORKS

BACKGROUND

The Internet is everywhere. Wireless networks with Internet connectivity can now be found not just in the offices of engineering companies and academic institutions, but in coffee shops, airports, and even supermarkets. Millions of people connect to the Internet each day over public wireless networks, performing transactions that range from browsing reviews of products to checking email to managing financial affairs. While some of these transactions will cause little harm if divulged, an attacker who snoops on a purchase or donation may be able to steal credit card data and other personal information. Any sensitive transaction conducted over a public wireless network puts the user at risk of having their accounts compromised and their identity stolen. Despite this risk, many users still routinely conduct transactions of all types over public wireless networks.

Unfortunately, traditional systems for securing computing devices against threats found on networks may not be able to secure users against the risks posed by attackers snooping on wireless network traffic. Traditional firewalls and other such applications may inspect incoming and outgoing traffic to a user's device but may not be able to affect what happens to traffic once it has left the device. Many websites use encryption ciphers to increase the difficulty of spying on sensitive traffic, but not all websites offer this option. Accordingly, the instant disclosure identifies and addresses a need for additional and improved systems and methods for detecting illegitimate devices on wireless networks.

SUMMARY

As will be described in greater detail below, the instant disclosure describes various systems and methods for detecting illegitimate devices on wireless networks by examining the devices that relay network traffic from a user's device to a destination and alerting the user if a change in the devices may be indicative of the presence of an illegitimate device, such as a pineapple, on the network.

In one example, a computer-implemented method for detecting illegitimate devices on wireless networks may include (1) identifying an initial set of hops that represent devices on a wireless network that relay network traffic between the computing device and a destination, (2) identifying, after identifying the initial set of hops, a new set of hops that relay the network traffic between the computing device and the destination, (3) comparing the initial set of hops to the new set of hops, and (4) determining, based on the comparison, that the new set of hops includes an abnormality that indicates an illegitimate device is intercepting the network traffic on the wireless network between the computing device and the destination.

In one example, the abnormality may include an additional hop found in the new set of hops and not found in the initial set of hops. In another example, the abnormality may include a change between a round trip time for a packet sent to an initial device in the initial set of hops and a new round trip time of a new packet sent to a new device in the new set of hops, where the new device is a same number of hops from the computing device as the initial device. Additionally or alternatively, the abnormality may include a new network address of a device found in the new set of hops and not in the initial set of hops.

In one embodiment, identifying the initial set of hops may include identifying a gateway device that is a connection point between the wireless network and an external network and that relays the network traffic from the wireless network to the external network. In this embodiment, identifying the new set of hops may include examining a set of hops in between the computing device and the gateway device.

In some embodiments, identifying the new set of hops may include periodically reexamining, at a predetermined interval, the devices on the wireless network that relay the network traffic between the computing device and the destination. Additionally or alternatively, the initial set of hops may include only a predetermined number of hops counting outward from the computing device, the new set of hops may include the same predetermined number of hops. In this embodiment, determining that the new set of hops may include the abnormality may include detecting the abnormality within the predetermined number of hops.

In one embodiment, identifying the initial set of hops may include identifying a cached set of hops from a previous connection of the computing device to the wireless network and identifying the new set of hops may include identifying devices that are relaying the network traffic for a current connection of the computing device to the wireless network. In this embodiment, comparing the initial set of hops to the new set of hops may include comparing the cached set of hops from the previous connection to the new set of hops from the current connection.

In some examples, the wireless network may include a public wireless network. Additionally or alternatively, identifying the initial set of hops may include executing a traceroute command, identifying the new set of hops may include repeating the traceroute command at a predetermined interval, and the abnormality may include a change in output of the traceroute command. In this embodiment, the illegitimate device may include a malicious device that intercepts the network traffic while relaying network traffic as if it were a legitimate network device. In some examples, the computer-implemented method may further include informing a user of the computing device about the illegitimate device on the wireless network.

In one embodiment, a system for implementing the above-described method may include (1) an identification module, stored in memory, that identifies an initial set of hops that represent devices on a wireless network that relay network traffic between the computing device and a destination and further identifies, after identifying the initial set of hops, a new set of hops that relay the network traffic between the computing device and the destination, (2) a comparison module, stored in memory, that compares the initial set of hops to the new set of hops, (3) a determination module, stored in memory, that determines, based on the comparison, that the new set of hops includes an abnormality that indicates an illegitimate device is intercepting the network traffic on the wireless network between the computing device and the destination, and (4) at least one physical processor configured to execute the identification module, the comparison module, and the determination module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an initial set of hops that represent devices on a wireless network that relay network traffic between the computing device and a destination, (2) identify, after identifying the initial set of hops, a new set of hops that relay the network traffic between the computing device and the destination, (3) compare the initial set of hops to the new set of hops, and (4) determine, based on the comparison, that the new set of hops includes an abnormality that indicates an illegitimate device is intercepting the network traffic on the wireless network between the computing device and the destination.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
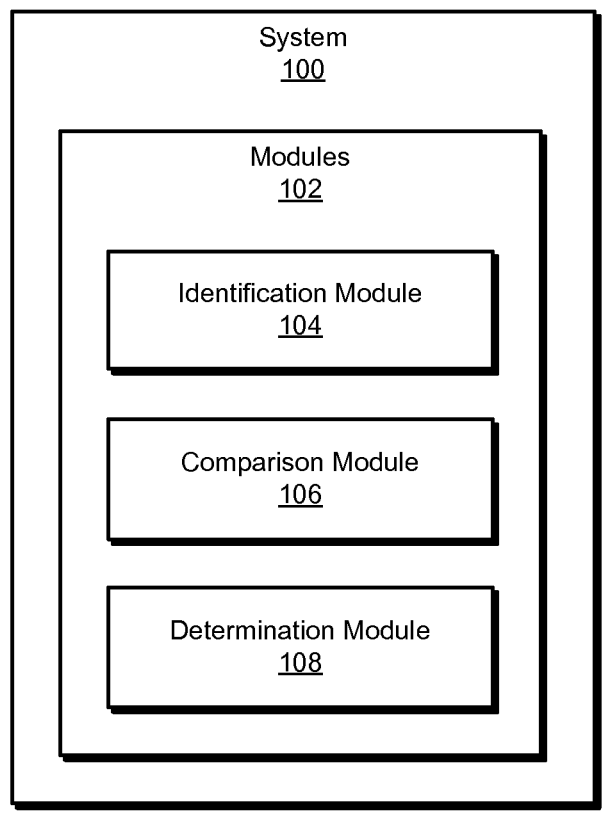
FIG. 1 is a block diagram of an exemplary system for detecting illegitimate devices on wireless networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting illegitimate devices on wireless networks. As will be explained in greater detail below, by continuously re-examining the devices that relay traffic over a wireless network between a user's computing device and a destination, the systems described herein may quickly detect illegitimate devices snooping on network traffic and warn the user before the illegitimate devices can intercept sensitive information.

For example, a security system on a user's laptop may identify a set of hops on a wireless network (e.g., in a public place, such as a coffee shop) by taking a traceroute and then caching the results. The security system may identify a new set of hops by running a new traceroute and may then compare the new results against the cached results. If the security system detects a change in the results, it may notify a user that an illegitimate device may be snooping on network traffic. In some examples, the change in the traceroute results may be caused by an attacker connecting a device such as a WI-FI PINEAPPLE to the wireless network. By notifying a user of potential network snooping, the security system may be able to prevent the user from carrying out sensitive transactions on the now-compromised wireless network and risking stolen accounts and/or identity theft.

Figure 2:
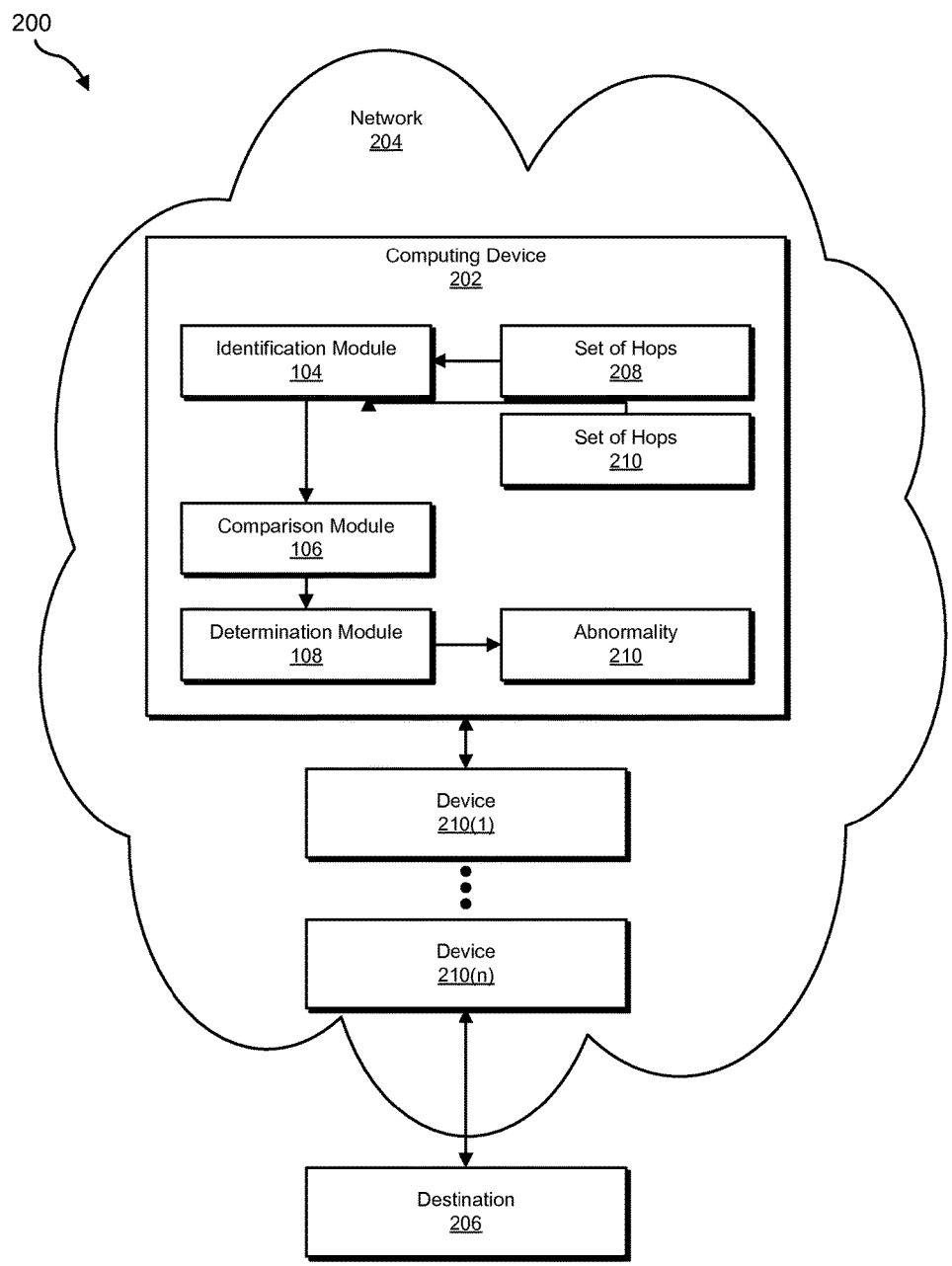
FIG. 2 is a block diagram of an additional exemplary system for detecting illegitimate devices on wireless networks.
Figure 3:
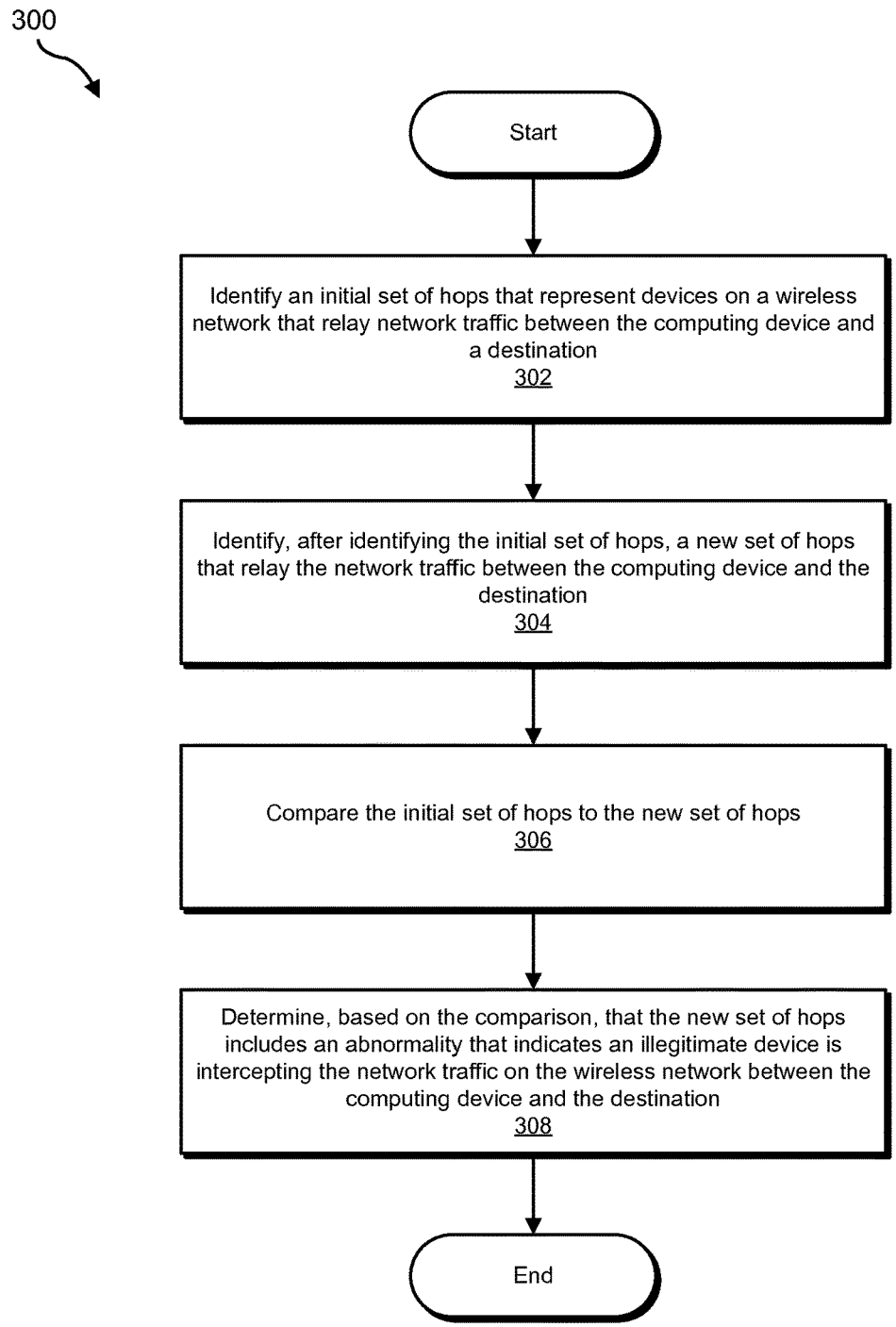
FIG. 3 is a flow diagram of an exemplary method for detecting illegitimate devices on wireless networks.
Figure 4:
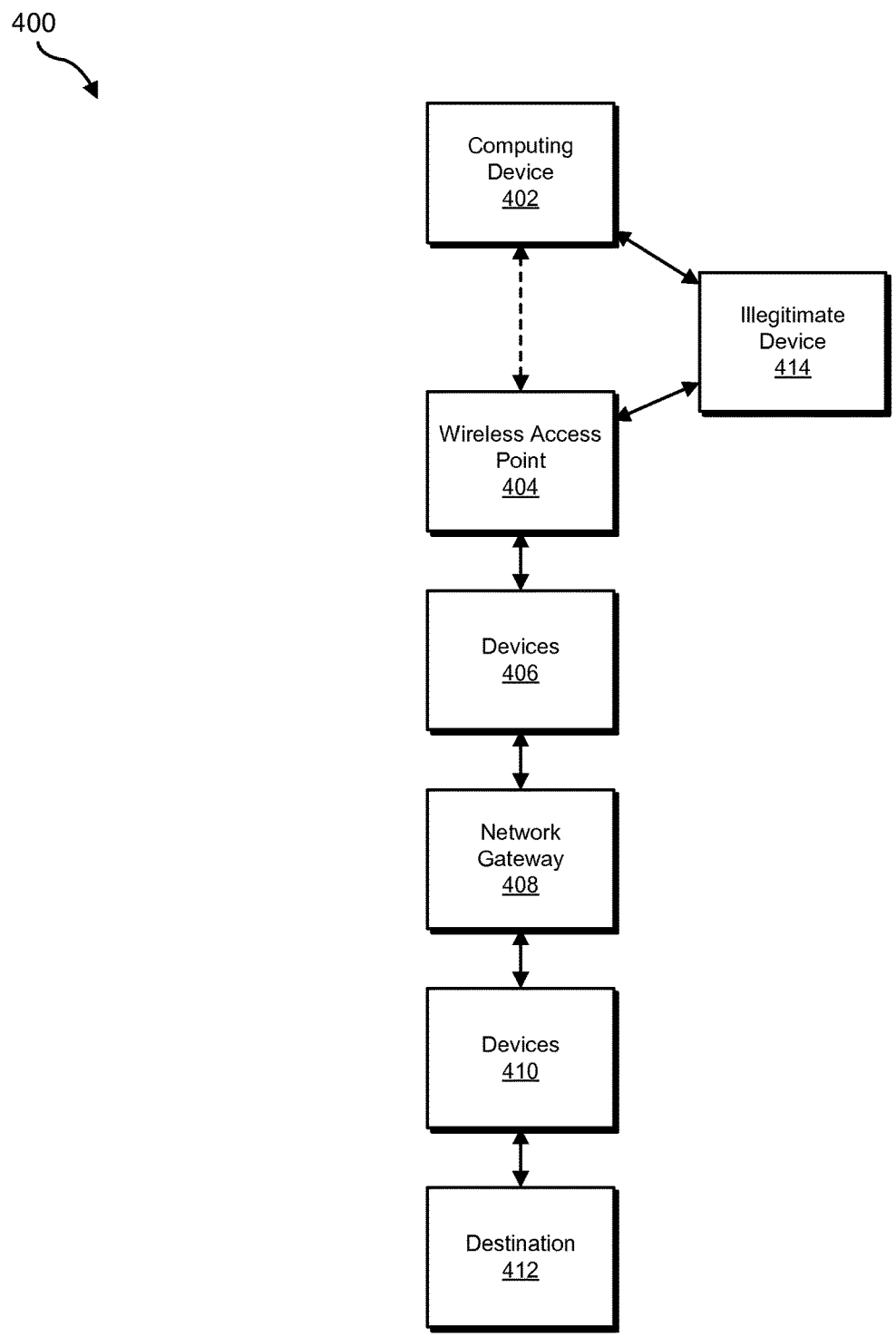
FIG. 4 is a block diagram of an exemplary computing system for detecting illegitimate devices on wireless networks.

The following will provide, with reference to FIGS. 1, 2, and 4, detailed descriptions of exemplary systems for detecting illegitimate devices on wireless networks. Detailed descriptions of corresponding computer-implemented methods will also be provided in connection with FIG. 3. Detailed descriptions of exemplary traceroute output will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for detecting illegitimate devices on wireless networks. As illustrated in this figure, exemplary system 100 may include one or more modules 102 for performing one or more tasks. For example, and as will be explained in greater detail below, exemplary system 100 may include an identification module 104 that may identify an initial set of hops that represent devices on a wireless network that relay network traffic between the computing device and a destination. Identification module 104 may also identify, after identifying the initial set of hops, a new set of hops that relay the network traffic between the computing device and the destination. Exemplary system 100 may additionally include a comparison module 106 that may compare the initial set of hops to the new set of hops. Exemplary system 100 may also include a determination module 108 that may determine, based on the comparison, that the new set of hops includes an abnormality that indicates an illegitimate device is intercepting the network traffic on the wireless network between the computing device and the destination. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a destination 206 via a set of devices 214(1) to 214(n). In one example, computing device 202 may be programmed with one or more of modules 102. In some embodiments, modules 102 may represent a security application installed on computing device 202. In some examples, devices 214(1) to 214(n) may represent a series of network devices relaying traffic between a personal computer represented by computing device 202 and a web server represented by destination 206.

In one embodiment, one or more of modules 102 from FIG. 1 may, when executed by at least one processor of computing device 202, enable computing device 202 to detect illegitimate devices on wireless networks. For example, and as will be described in greater detail below, identification module 104 may identify a set of hops 208 that represent devices 214(1) through 214(n) on a wireless network that relay network traffic between computing device 202 and destination 206. After identifying set of hops 208, identification module 104 may identify a set of hops 210 that relay network traffic between computing device 202 and destination 206. Next, comparison module 106 may compare set of hops 208 to set of hops 210. Finally, determination module 108 may determine, based on the comparison, that set of hops 210 includes an abnormality 212 that indicates an illegitimate device is intercepting network traffic on the wireless network between computing device 202 and destination 206.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Destination 206 generally represents any type or form of computing device that is capable of functioning as the end point of a traceroute. Examples of destination 206 include, without limitation, web servers, application servers, and database servers configured to provide various database services and/or run certain software applications. In some embodiments, destination 206 may include a server specifically configured to serve as the endpoint for traceroutes that attempt to detect illegitimate network devices. For example, destination 206 may be "ping.norton.com" and identification module 104 may be configured to use "ping.norton.com" as the endpoint for all traceroutes made to identify sets of hops.

FIG. 3 is a flow diagram of an exemplary computer-implemented method 300 for detecting illegitimate devices on wireless networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify an initial set of hops that represent devices on a wireless network that relay network traffic between the computing device and a destination. For example, identification module 104 may, as part of computing device 202 in FIG. 2, identify set of hops 208 that represent devices 214(1) through 214(n) on a wireless network that relay network traffic between computing device 202 and destination 206.

The term "wireless network," as used herein, generally represents any medium or architecture capable of facilitating communication or data transfer. Examples of a network include, without limitation, an intranet, a Wide Area Network (WAN), a Local Area Network (LAN), a Personal Area Network (PAN), the Internet, a cellular network (e.g., a Global System for Mobile Communications (GSM) network), exemplary network architecture 700 in FIG. 7, or the like. In one embodiment, the wireless network may include a public wireless network; that is, a wireless network at a public location that is either not password protected or that is accessible via an easily obtainable password that is posted publically, given out to customers, and/or otherwise widely distributed. In some examples, the wireless network may include an illegitimate wireless network identifier broadcast by an illegitimate device, where the identifier has the same or a similar name to an unsecured wireless network, such as "free airport wireless." In these examples, the computing device may connect to a legitimate public wireless network via the illegitimate identifier broadcast by the illegitimate device.

The term "device," as used herein, generally refers to any device that is capable of relaying traffic on a network. A device may be specifically built to relay network traffic and/or may be a more general device that is currently configured to relay network traffic. Examples of a device may include, without limitation, a computing device, a server, a network gateway, a router, a network repeater, a network switch, a network bridge, and/or any other suitable network device.

The term "hop," as used herein, generally refers to any description of a device and/or a connection between one device and another. For example, a hop may include an Internet protocol (IP) address of a device, a domain name of a device, a network path including a device, and/or the time it takes a packet to make a roundtrip from the originating computing device to a device. In one example, a hop may be described by a portion of the output produced by a traceroute command that sends one or more packets to the device. For example, a hop may include the text, "175.54.128.115; 30 milliseconds."

Identification module 104 may identify the set of hops in a variety of ways. For example, identification module 104 may send sequential messages to each device in the set of hops and record information about the replies from the devices. In one example, identification module 104 may use a traceroute command to identify the set of hops.

In one embodiment, the initial set of hops may include a subset of the devices that are a predetermined number of hops counting outward from the computing device. For example, identification module 104 may only identify the first three hops or the first five hops from the computing device. In some embodiments, a user may be able to configure the predetermined number of hops. For example, a user may choose to examine only the first two hops in order to conserve computing resources and/or may choose to examine the first ten hops in an attempt to increase the likelihood that any abnormality will be detected.

Additionally or alternatively, identification module 104 may identify the initial set of hops by identifying a gateway device that is a connection point between the wireless network and an external network and that relays the network traffic from the wireless network to the external network. Identification module 104 may identify the gateway device using a variety of methods. For example, identification module 104 may use a web service, a web site, and/or the network stack of the computing device in order to identify the gateway device.

In some examples, the gateway device may be within the predetermined number of hops and/or the predetermined number of hops may be set based on the position of the gateway device. For example, identification module 104 may identify a network gateway four hops away from the computing device. In this example, identification module 104 may then only examine the first four hops when identifying the new set of hops. In another example, identification module 104 may inform the user that the network gateway is four hops away from the computing device so that the user can make an informed decision about how many hops identification module 104 should identify in the future.

In some embodiments, identification module 104 may also identify a wireless access point among the devices. In many examples, the wireless access point may be the first hop from the computing device. As illustrated in FIG. 4, a computing device 402 may send and receive network traffic on a local network 414 via a wireless access point 404. Wireless access point 404 may relay the network traffic to devices 406 that may include any type of network devices. A network gateway 408 may receive network traffic from devices 406 and/or may connect local network 414 to an external network 416. In some examples, external network 416 may include the Internet. One or more devices 410 on external network 416 may relay network traffic to destination 412.

In some embodiments, identification module 104 may identify a set of hops that includes wireless access point 404, any or all of devices 406, and/or network gateway 408. In other embodiments, identification module 104 may identify a set of hops that also includes any or all of devices 410 and/or destination 412. In some embodiments, identification module 104 may flag wireless access point 404 and/or network gateway 408 for a user so that the user can determine how many hops identification module 104 should examine based on the position of wireless access point 404 and/or network gateway 408.

Returning to FIG. 3, at step 304, one or more of the systems described herein may identify, after identifying the initial set of hops, a new set of hops that relay the network traffic between the computing device and the destination. For example, identification module 104 may, as part of computing device 202 in FIG. 2, identify, after identifying set of hops 208, set of hops 210 that relay network traffic between computing device 202 and destination 206.

Identification module 104 may identify the new set of hops in a variety of ways. For example, identification module 104 may identify the new set of hops by periodically reexamining, at a predetermined interval, the devices on the wireless network that relay the network traffic between the computing device and the destination. In one embodiment, identification module 104 may run a traceroute every minute, or every thirty seconds, or every five seconds. In some embodiments, a user may be able to configure the interval at which identification module 104 identifies the new set of hops.

In some embodiments, if the initial set of hops included a predetermined number of hops, the new set of hops may include the same predetermined number of hops. For example, if identification module 104 identified five hops at step 302, identification module 104 may also identify five hops at step 304. Additionally or alternatively, if identification module 104 identified a gateway device at step 302, identification module 104 may only examine hops between the computing device and the gateway device at step 304.

In one embodiment, identification module 104 may identify the initial set of hops by identifying a cached set of hops from a previous connection of the computing device to the wireless network and then may identify the new set of hops may by identifying devices that are relaying the network traffic for a current connection of the computing device to the wireless network. In some embodiments, the computing device may store one or more cached sets of hops for every stored wireless network profile. In another embodiment, the computing device may store a cached set of hops only for frequently visited wireless networks. Additionally or alternatively, the computing device may correlate cached sets of hops with some other identifier, such as global positioning system coordinates of the location of the computing device.

In some embodiments, identification module 104 may periodically refresh the cached set of hops by caching a new set of hops. If there is no cached set of hops for a wireless network, identification module 104 may identify an initial set of hops for that wireless network and/or may cache the newly identified initial set of hops.

At step 306, one or more of the systems described herein may compare the initial set of hops to the new set of hops. For example, comparison module 106 may, as part of computing device 202 in FIG. 2, compare set of hops 208 to set of hops 210.

Comparison module 106 may compare the sets of hops in a variety of ways. For example, comparison module 106 may compare each set of hops one hop at a time. In some examples, comparison module 106 may compare the hops based on domain name, address, the time it takes a packet to make a roundtrip from the computing device to the hop, and/or any other information about the hops.

In some embodiments, comparison module 106 may display one or both sets of hops in a user interface so that a user may compare the sets of hops. Comparison module 106 may only display the sets of hops if comparison module 106 detects a difference between the sets of hops.

At step 308, one or more of the systems described herein may determine, based on the comparison, that the new set of hops includes an abnormality that indicates an illegitimate device is intercepting the network traffic on the wireless network between the computing device and the destination. For example, determination module 108 may, as part of computing device 202 in FIG. 2, determine, based on the comparison, that set of hops 210 may include abnormality 212 that indicates an illegitimate device is intercepting network traffic on the wireless network between computing device 202 and destination 206.

The term "abnormality," as used herein, generally refers to any change between the initial set of hops and the new set of hops. For example, an abnormality may include an additional hop and/or a change in a hop. An abnormality may also include an unusual characteristic of a hop, such as an unusual address, an unusual timing, or any other feature not typically found in a hop.

The term "illegitimate device," as used herein, generally refers to any hardware device designed and/or configured to intercept traffic on a wireless network while relaying network traffic as if it were a legitimate network device. An illegitimate device may monitor and record network traffic and/or may alter network traffic. In some embodiments, an illegitimate device may also broadcast an illegitimate wireless network identifier to fool computing devices into connecting to a network via the illegitimate device.

Examples of illegitimate devices include a WI-FI PINEAPPLE. For example, a WI-FI PINEAPPLE may intercept requests from computing devices to connect to previous networks. Many computing devices are configured to automatically attempt to connect to all saved network profiles. A computing device attempting to connect to a saved network profile may broadcast the network identifier of the network profile in an attempt to get a response from a wireless access point for the network. An illegitimate device such as a WI-FI PINEAPPLE may take advantage of this behavior by listening for requests to connect to wireless access points and then broadcasting the intercepted network identifier as if the WI-FI PINEAPPLE were the wireless access point for that network. In one example, a computing device may attempt to automatically connect the previously used "coffee shop public wifi" network. In this example, the WI-FI PINEAPPLE may intercept the request to connect to "coffee shop public wifi" and may send a response to the computing device indicating that the network "coffee shop public wifi" is available. The computing device may then automatically connect to the fake "coffee shop public wifi" network via the WI-FI PINEAPPLE, which may inspect and/or store all of the computing device's network traffic before forwarding the traffic to its final destination via a legitimate network. In this example, the WI-FI PINEAPPLE may appear to be a legitimate network device in the results of any traceroute run by the computing device. This distinguishes the WI-FI PINEAPPLE from other illegitimate devices, such as a computing device running the FIRESHEEP plug-in, which may passively monitor traffic on a wireless network but which does not insert itself between the computing device and the end point and therefore would not be visible on a traceroute.

Determination module 108 may determine that the new set of hops includes an abnormality in a variety of ways. For example, determination module 108 may determine that any difference between the initial set of hops and the new set of hops constitutes an abnormality. In another embodiment, determination module 108 may have a tolerance for differences between the sets of hops. For example, determination module 108 may not consider a timing difference of less than ten milliseconds to be an abnormality.

In some examples, determination module 108 may determine there is an abnormality by looking at a comparison of only a limited number of hops. Returning to FIG. 4, in many examples, an illegitimate device 418 may intercept the network traffic between the computing device 402 and the wireless access point 404. In these examples, determination module 108 may only examine the comparison of the first hop in each set of hops to determine that there is an abnormality. In other embodiments, determination module 108 may examine the comparison of all the hops between the computing device and the network gateway and/or a limited number of hops, such as five hops or three hops.

In one example, the abnormality may include an additional hop found in the new set of hops and not found in the initial set of hops. For example, as illustrated in FIG. 4, illegitimate device 418 may insert itself between computing device 402 and wireless access point 404, where wireless access point 404 was originally the first hop. In another example, illegitimate device 418 may intercept network traffic between two of the devices in devices 406 before network gateway 408 and determination module 108 may determine that there is an additional hop in the new set of hops that includes illegitimate device 418.

In one example, the abnormality may include a change in a hop. For example, the abnormality may include a difference between a round trip time for a packet sent to a device in the initial set of hops and a new round trip time of a packet sent to the device at the same position in the new set of hops. Additionally or alternatively, the abnormality may include a new network address of a device found in the new set of hops and not in the initial set of hops.

Figure 5:
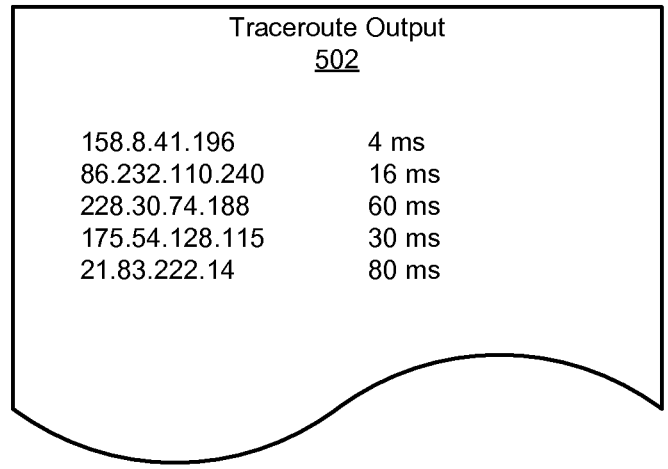
FIG. 5 is a block diagram of exemplary output of a traceroute command.
Figure 5:
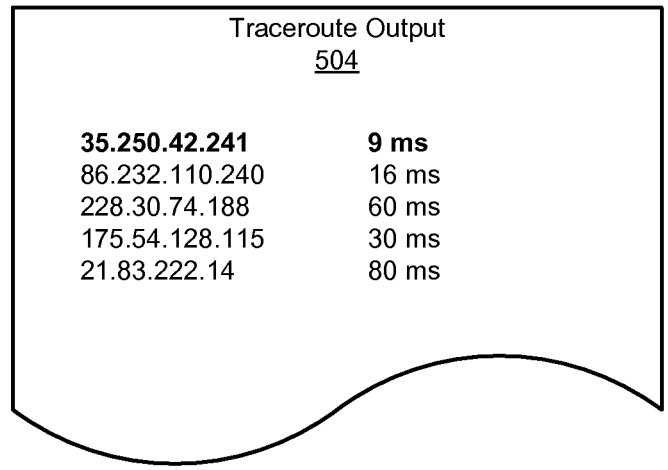

In some embodiments, the changes in the hop may be visible in the output of a traceroute command. As illustrated in FIG. 5, traceroute output 502 may include the IP addresses and roundtrip times in milliseconds for five hops. Traceroute output 504 may also include the IP address and roundtrip times for five hops. In some examples, the first hop displayed in traceroute output 502 may be different from the first hop displayed in traceroute output 504. For example, as illustrated in FIG. 5, the first hop in traceroute output 502 may have an IP address of 158.8.41.196 and/or a roundtrip time of 4 ms, while the first hop in traceroute output 504 may have an IP address of 35.250.42.241 and/or a roundtrip time of 9 ms. In some embodiments, determination module 108 may determine that the change in IP address and/or the change in timing constitutes an abnormality that may be indicative of the presence an illegitimate device on the network.

In some examples, the systems described herein may inform a user of the computing device about the illegitimate device on the wireless network. For example, the systems described herein may display a notification to the user about the illegitimate device. Additionally or alternatively, the systems described herein may display information about the hops, such as the output of a traceroute, to the user. In some embodiments, the warning to the user may appear in the same user interface that displays hop information and/or configuration options to the user. In other embodiments, the systems described herein may function in the background without a user interface and/or the warning may appear separately. In one embodiment, the warning may appear in a browser window and/or another application that sends data over the wireless network.

In some embodiments, the systems described herein may disconnect the computing device from the wireless network in response to detecting the illegitimate device. In other embodiments, the systems described herein may filter outgoing network traffic from the computing device, for example by only allowing encrypted traffic and/or blocking or warning the user about any traffic that may include sensitive information. For example, the systems described herein may allow a user to browse stories on a news website but may block the user from logging in to a bank website.

In some embodiments, the systems described herein may store a warning about the wireless network in response to detecting the illegitimate device and/or may warn the user in the future when connecting to the wireless network that the wireless network may be subject to snooping from illegitimate devices. Additionally or alternatively, the systems described herein may send information about the wireless network and/or illegitimate device to a security database.

As explained in connection with method 300 above, the systems described herein may detect an illegitimate device on a wireless network. Public wireless networks may be easily exploitable, especially when carrying sensitive traffic that is not encrypted. Devices designed to snoop on wireless network traffic are often designed to be difficult to detect, making securing against them more challenging. However, any device, illegitimate or legitimate, that is relaying network traffic may be visible to a traceroute. By taking an initial traceroute and then continuously running new traceroutes and comparing them to the original, the systems described herein may be able to quickly detect changes to the traceroute that may indicate an illegitimate device. As noted above, a new hop in the traceroute, a new address, or a timing difference may all indicate that an illegitimate device has inserted itself into the wireless network and is now relaying network traffic from the computing device to the destination. By immediately alerting the user that an illegitimate device may be intercepting their traffic on a public wireless network, the systems described herein may prevent a user from sending sensitive information over the compromised wireless network and consequently suffering from identity theft or a host of other problems related to stolen personal information.

Figure 6:
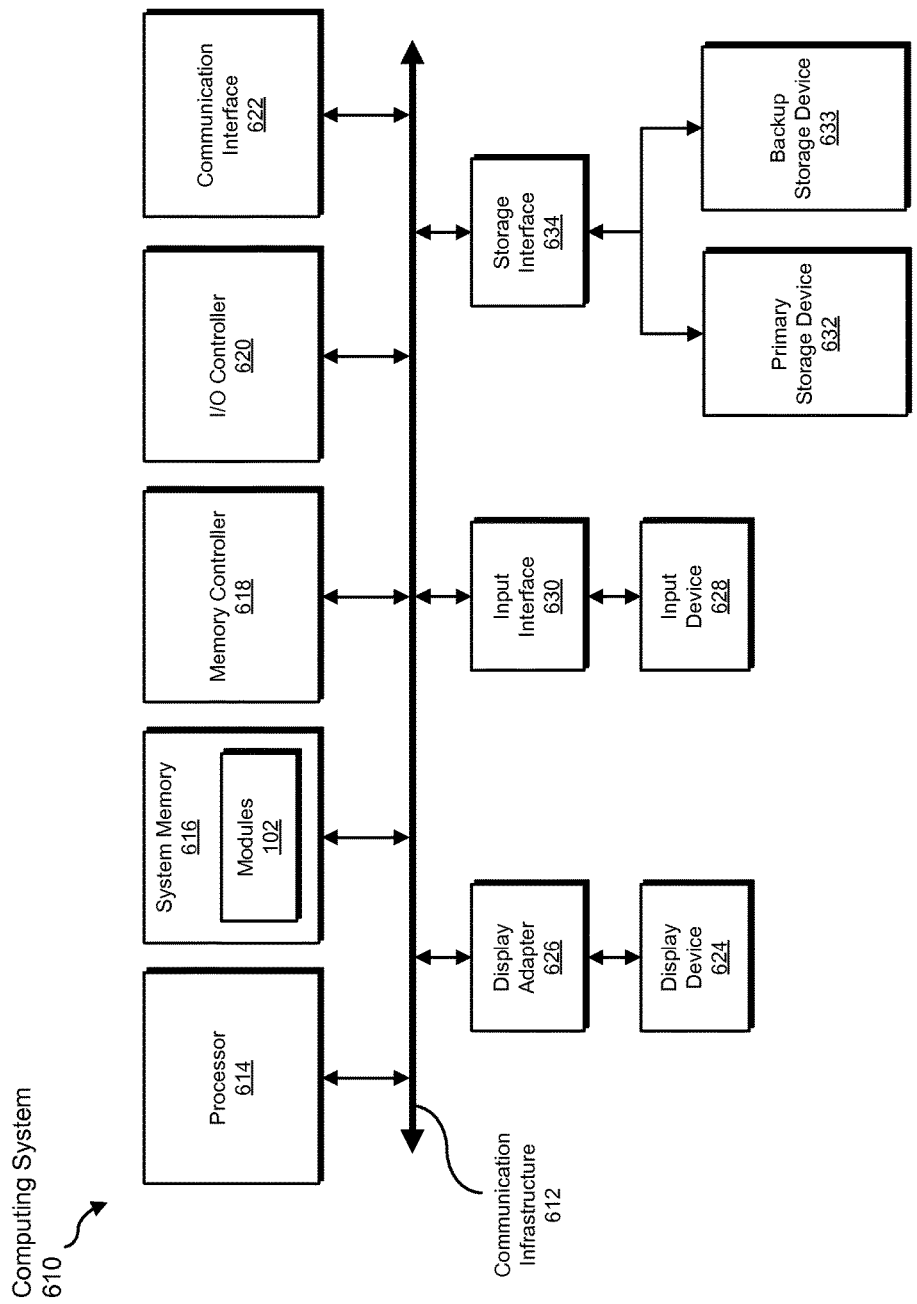
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
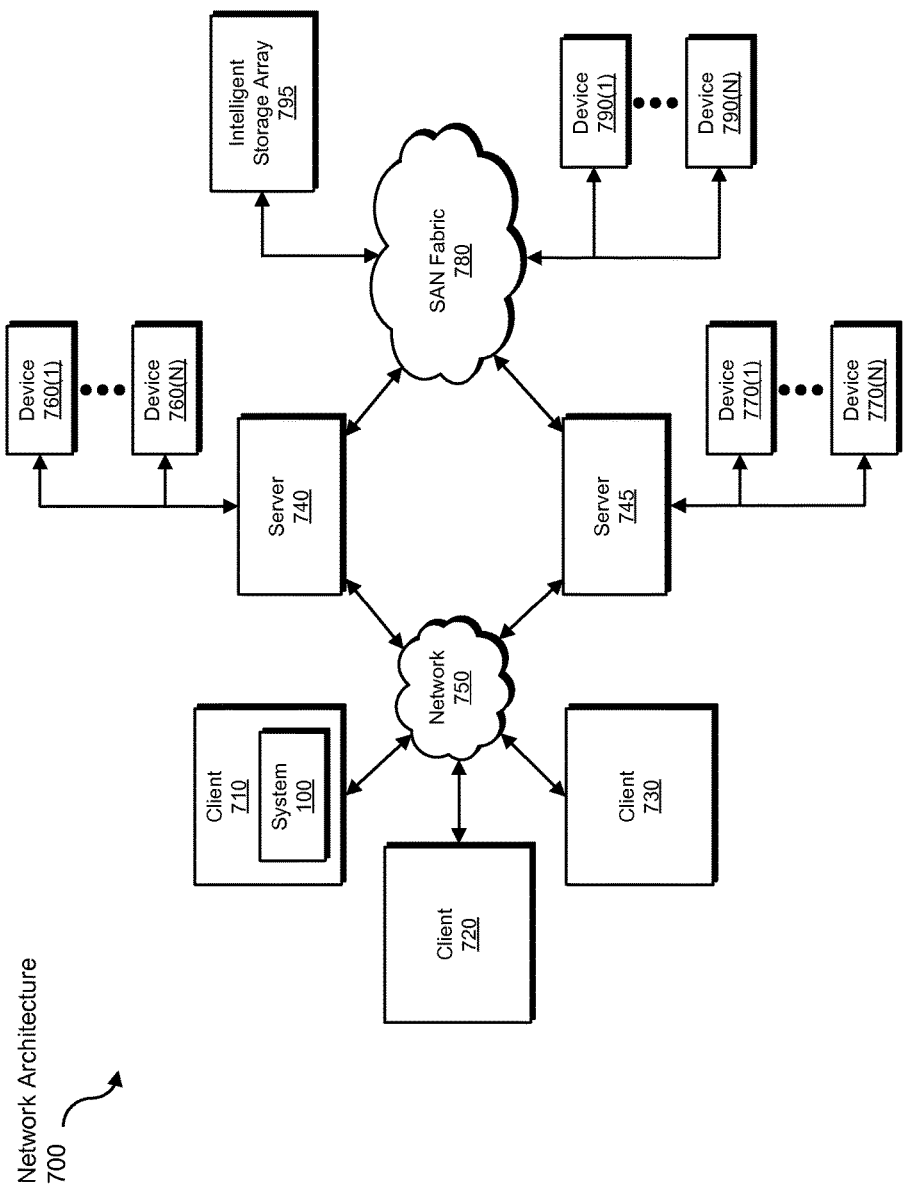
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting illegitimate devices on wireless networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive network device data to be transformed, transform the network device data into a set of hops, output a result of the transformation to a command line interface, user interface, and/or application, use the result of the transformation to determine if any network devices are suspicious, and store the result of the transformation to a cache. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting illegitimate devices on wireless networks, at least a portion of the method being performed by a computing device comprising at least one processor, the method comprising:
    recording, by a security system on the computing device and based on a connection of the computing device to a wireless network, an initial set of hops that:
        represent devices on the wireless network that relay network traffic between the computing device and a destination;
        are recorded from information about replies from the devices to messages sent by the computing device to each device in the initial set of hops; and
        comprise a subset of the devices that are a predetermined number of hops counting outward from the computing device;
    identifying, by the security system and after identifying the initial set of hops, a new set of hops that relay the network traffic between the computing device and the destination based on a subsequent connection of the computing device to the wireless network;
    comparing the initial set of hops to the new set of hops;
    determining, based on the comparison and based on identifying a change between the initial set of hops and the new set of hops, that the new set of hops comprises an abnormality that indicates an illegitimate device is intercepting the network traffic on the wireless network between the computing device and the destination; and
    preventing, by the security system, a user from sending sensitive information over the wireless network.

2. The computer-implemented method of claim 1, wherein the abnormality comprises an additional hop found in the new set of hops and not found in the initial set of hops.

3. The computer-implemented method of claim 1, wherein the abnormality comprises a change between a round trip time for a packet sent to an initial device in the initial set of hops and a new round trip time of a new packet sent to a new device in the new set of hops, wherein the new device is a same number of hops from the computing device as the initial device.

4. The computer-implemented method of claim 1, wherein the abnormality comprises a new network address of a device found in the new set of hops and not in the initial set of hops.

5. The computer-implemented method of claim 1, wherein:
    recording the initial set of hops comprises identifying a gateway device that is a connection point between the wireless network and an external network and that relays the network traffic from the wireless network to the external network; and
    identifying the new set of hops comprises examining a set of hops in between the computing device and the gateway device.

6. The computer-implemented method of claim 1, wherein identifying the new set of hops comprises periodically reexamining, at a predetermined interval, the devices on the wireless network that relay the network traffic between the computing device and the destination.

7. The computer-implemented method of claim 1, wherein:
    recording the initial set of hops comprises identifying a cached set of hops from a previous connection of the computing device to the wireless network;
    identifying the new set of hops comprises identifying devices that are relaying the network traffic for a current connection of the computing device to the wireless network; and comparing the initial set of hops to the new set of hops comprises comparing the cached set of hops from the previous connection to the new set of hops from the current connection.

8. The computer-implemented method of claim 1, wherein preventing the user from sending sensitive information over the wireless network comprises at least one of:
   disconnecting the computing device from the wireless network;
   filtering outgoing traffic from the computing device;
   storing a warning about the wireless network that the wireless network may be subject to snooping from illegitimate devices; and
   informing a user of the computing device about the illegitimate device on the wireless network.

9. The computer-implemented method of claim 1, wherein:
   the initial set of hops comprises a subset of the devices, wherein the subset of the devices comprises a predetermined number of hops counting outward from the computing device;
   the new set of hops comprises the same predetermined number of hops counting outward from the computing device; and
   determining that the new set of hops comprises the abnormality comprises detecting the abnormality within the predetermined number of hops.

10. The computer-implemented method of claim 1, wherein:
    the wireless network comprises a public wireless network;
    identifying the initial set of hops comprises executing a traceroute command;
    identifying the new set of hops comprises repeating the traceroute command at a predetermined interval;
    the abnormality comprises a change in output of the traceroute command; and
    the illegitimate device comprises a malicious device that intercepts the network traffic while relaying the network traffic as if it were a legitimate network device.

11. A system for detecting illegitimate devices on wireless networks, the system comprising:
    an identification module, stored in memory, that:
      records, by a security system on a computing device and based on a connection of the computing device to a wireless network, an initial set of hops that:
        represent devices on the wireless network that relay network traffic between a computing device and a destination;
        are recorded from information about replies from the devices to sequential messages sent by the computing device to each device in the initial set of hops; and
        comprise a subset of the devices that are a predetermined number of hops counting outward from the computing device; and
      identifies, by the security system and after identifying the initial set of hops, a new set of hops that relay the network traffic between the computing device and the destination based on a subsequent connection of the computing device to the wireless network;
    a comparison module, stored in memory, that compares the initial set of hops to the new set of hops;
    a determination module, stored in memory, that:
      determines, based on the comparison and based on identifying a change between the initial set of hops and the new set of hops, that the new set of hops comprises an abnormality that indicates an illegitimate device is intercepting the network traffic on the wireless network between the computing device and the destination; and
      prevents, by the security system, a user from sending sensitive information over the wireless network; and
    at least one physical processor configured to execute the identification module, the comparison module, and the determination module.

12. The system of claim 11, wherein the abnormality comprises an additional hop found in the new set of hops and not found in the initial set of hops.

13. The system of claim 11, wherein the abnormality comprises a change between a round trip time for a packet sent to an initial device in the initial set of hops and a new round trip time of a new packet sent to a new device in the new set of hops, wherein the new device is a same number of hops from the computing device as the initial device.

14. The system of claim 11, wherein the abnormality comprises a new network address of a device found in the new set of hops and not in the initial set of hops.

15. The system of claim 11, wherein:
    the identification module records the initial set of hops by identifying a gateway device that is a connection point between the wireless network and an external network and that relays the network traffic from the wireless network to the external network; and
    the identification module identifies the new set of hops by examining a set of hops in between the computing device and the gateway device.

16. The system of claim 11, wherein the identification module identifies the new set of hops by periodically reexamining, at a predetermined interval, the devices on the wireless network that relay the network traffic between the computing device and the destination.

17. The system of claim 11, wherein:
    the identification module records the initial set of hops by identifying a cached set of hops from a previous connection of the computing device to the wireless network;
    the identification module identifies the new set of hops by identifying devices that are relaying the network traffic for a current connection of the computing device to the wireless network; and
    the comparison module compares the initial set of hops to the new set of hops by comparing the cached set of hops from the previous connection to the new set of hops from the current connection.

18. The system of claim 11, wherein the determination module informs a user of the computing device about the illegitimate device on the wireless network.

19. The system of claim 11, wherein:
    the initial set of hops comprises a subset of the devices, wherein the subset of the devices comprises a predetermined number of hops counting outward from the computing device;
    the new set of hops comprises the same predetermined number of hops counting outward from the computing device; and
    the determination module determines that the new set of hops comprises the abnormality by detecting the abnormality within the predetermined number of hops.

20. A non-transitory computer-readable medium comprising one or more computer-readable instructions that, when executed by at least one processor of a computing device, cause the computing device to:

record, by a security system on the computing device and based on a connection of the computing device to a wireless network, an initial set of hops that:
  represent devices on the wireless network that relay network traffic between the computing device and a destination;
  are recorded from information about replies from the devices to messages sent by the computing device to each device in the initial set of hops; and
  comprise a subset of the devices that are a predetermined number of hops counting outward from the computing device;
identify, by the security system and after identifying the initial set of hops, a new set of hops that relay the network traffic between the computing device and the destination;
compare the initial set of hops to the new set of hops;
determine, based on the comparison and based on identifying a change between the initial set of hops and the new set of hops, that the new set of hops comprises an abnormality that indicates an illegitimate device is intercepting the network traffic on the wireless network between the computing device and the destination; and
prevent, by the security system, a user from sending sensitive information over the wireless network.

* * * * *